United States Patent
Mast

(10) Patent No.: US 9,633,393 B2
(45) Date of Patent: Apr. 25, 2017

(54) EXTENSIBLE SOFTWARE ARCHITECTURE FOR PROCESSING LEVEL 2 FINANCIAL DATA

(75) Inventor: Jason Mast, Algonquin, IL (US)

(73) Assignee: International Business Machines Corporation, Armonk, NY (US)

( * ) Notice: Subject to any disclaimer, the term of this patent is extended or adjusted under 35 U.S.C. 154(b) by 1752 days.

(21) Appl. No.: 12/774,787

(22) Filed: May 6, 2010

(65) Prior Publication Data

US 2011/0276707 A1 Nov. 10, 2011

(51) Int. Cl.
*G06Q 20/04* (2012.01)
*G06Q 40/04* (2012.01)

(52) U.S. Cl.
CPC .................. *G06Q 40/04* (2013.01)

(58) Field of Classification Search
USPC ...................................................... 705/35–45
See application file for complete search history.

(56) References Cited

U.S. PATENT DOCUMENTS

| | | | | |
|---|---|---|---|---|
| 4,486,853 A | * | 12/1984 | Parsons | 345/418 |
| 6,049,391 A | * | 4/2000 | Farrell | 358/1.15 |
| 6,686,908 B1 | * | 2/2004 | Kobayashi | 345/173 |
| 2002/0055899 A1 | * | 5/2002 | Williams | 705/37 |
| 2003/0018550 A1 | * | 1/2003 | Rotman et al. | 705/35 |
| 2007/0143198 A1 | | 6/2007 | Brandes et al. | |
| 2007/0294162 A1 | | 12/2007 | Borkovec | |
| 2008/0107272 A1 | * | 5/2008 | Carmeli et al. | 380/278 |

FOREIGN PATENT DOCUMENTS

JP 2005202977 A 7/2005

* cited by examiner

*Primary Examiner* — Jennifer Liu
*Assistant Examiner* — Chia Yi Liu
(74) *Attorney, Agent, or Firm* — Steven M. Greenberg, Esq.; CRGO Law

(57) ABSTRACT

The present invention processes and distributes Level 2 financial data. This invention comprises a constituent component that identifies various pieces of information that are contained in stock feeds. These pieces of information are identified and keys are generated based on the various pieces of information and combinations of pieces of information. The information in the incoming stock feeds can be sorted and processed based on a particular key or keys depending on the desires of a particular client. In addition, new keys can be generated based on the preference of a particular client. This flexibility to create the various keys to be used to process feed information is different from conventional methods that use only a standard set of sorting and processing criteria for all feeds and for all clients.

14 Claims, 6 Drawing Sheets

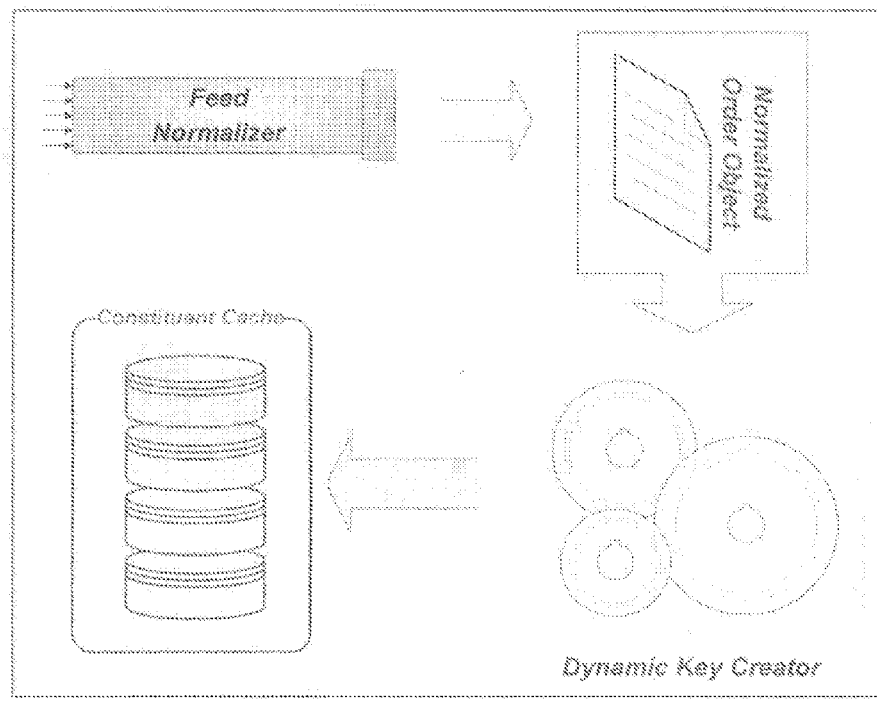

FIG. 3

| Name | Data type | Description |
|---|---|---|
| Symbol | String | The symbol this data belongs to |
| MMID | String | The Market Maker ID for this data |
| Order ID | BookOrderId | The upstream identifier for this constituent |
| Market Side | MarketSide | 'Bid' or 'Ask' |
| Current Size | UINT32 | The current total number of shares or this constituent |
| Delta Size | INT32 | The change in total shares in the most recent update |
| Price | BookPrice | The price associated with this constituent |
| Timestamp | BookTime | The time of the most recent update |
| Sequence No. | INT32 | The upstream sequence number of the most recent update |
| Feed ID | uFeedID | The identifier of the feed this constituent originated from |
| Number Orders | UINT32 | The number of individual orders that make up this constituent |
| Delta Orders | INT32 | The change in total orders in the most recent update |

FIG. 4

| BEST_BID1: 82.18 | BEST_BSZ1: 100 | NO_BIDORD1: 1 | BEST_BPART1: ARCA | NO_BIDMKR1: 1 |
| BEST_BID2: 82.17 | BEST_BSZ2: 200 | NO_BIDORD2: 4 | BEST_BPART2: ARCA | NO_BIDMKR2: 3 |
| BEST_BID3: 82.16 | BEST_BSZ3: 400 | NO_BIDORD3: 8 | BEST_BPART3: ARCA | NO_BIDMKR3: 1 |
| BEST_ASK1: 82.19 | BEST_ASZ1: 100 | NO_ASKORD1: 2 | BEST_APART1: ARCA | NO_ASKMKR1: 2 |
| BEST_ASK2: 82.20 | BEST_ASZ2: 300 | NO_ASKORD2: 5 | BEST_APART2: ARCA | NO_ASKMKR2: 3 |
| BEST_ASK3: 82.21 | BEST_ASZ3: 200 | NO_ASKORD3: 2 | BEST_APART3: ARCA | NO_ASKMKR3: 1 |

FIG. 5

|  | PRICE | SHARES | TIME | ORDID | NUM_ORDERS | PARTICIPANT |
|---|---|---|---|---|---|---|
| IBM:82.18 | 82.18 | 100 | 12:14:08.282 | 2403489 | 1 | ARCA |
| IBM:82.21 | 82.21 | 500 | 11:24:19.042 | 423412 | 3 | ARCA |
| IBM:82.50 | 82.50 | 20 | 11:48:09.388 | 331234 | 1 | ARCA |
| IBM:0.01 | 0.01 | 1000 | 10:04:55.709 | 231893 | 5 | ARCA |
| IBM:9999 | 9999 | 800 | 09:30:01.133 | 21412 | 4 | ARCA |
| IBM:82.16 | 82.16 | 400 | 12:15:02.640 | 2775456 | 8 | ARCA |

FIG. 6

| OrderInstance Member | ITRecord Field Name |
|---|---|
| symbol() | "SYMBOL" |
| timestamp() | "EXCHTIM" |
| orderId() | "SOURCE_ID" |
| opcode() | "ACT_FLAG" |
| marketSide() | "MKT_SIDE" |
| price() | "MKT_PRICE" |
| currentSize() | "LAST_VOLUME" |
| mmid() | "LAST_PART" |

FIG. 7

| Configuration Constant | Description |
| --- | --- |
| BOOK_BY_ORDER | Uses the order identifier to create a key |
| BOOK_BY_LEVEL | Uses a 'NULL' key and processes based on price level (position) |
| BOOK_BY_PRICE | Uses the symbol, price and market side to create a key |

FIG. 8

| Flag Value | Description |
| --- | --- |
| 1 | BOOKMGR_OPT_UNIQUE: Constituents have unique names |
| 2 | BOOKMGR_OPT_THREADSAFE: This manager should be thread-safe |
| 4 | BOOKMGR_OPT_ORDERED: This manager should maintain price ordering |

FIG. 9

| Configuration Constant | Description |
| --- | --- |
| RECORD | Create a LevelRecordPublisher instance |
| GRID | Create a FullGridPublisher instance |
| EVENT | Create a EventRecordPublisher instance |
| NATIVE | Create a NativePublisher instance |

FIG. 10

| Configuration Constant | Example |
|---|---|
| BOOK_SYMB | IBM |
| BOOK_SYMB_SIDE | IBM_BID |
| BOOK_SYMB_MMID | IBM.ARCA |
| BOOK_SYMB_SIDE_MMID | IBM_BID.ARCA |

FIG. 11

EXTENSIBLE SOFTWARE ARCHITECTURE FOR PROCESSING LEVEL 2 FINANCIAL DATA

FIELD OF THE INVENTION

This invention relates to an architecture for processing level 2 financial data and in particular this invention relates to a method and system for expanded processing of financial data from raw financial data feeds using newly identified processing criteria and using newly created processing architectures to produce custom sets of processed level 2 financial as desired by a particular client. The present invention further provides architectures that will translate the newly processed custom data sets into output formats that are compatible with client's current output devices.

BACKGROUND OF THE INVENTION

A nerve center for any financial system is the stock market exchange. A stock market exchange is an organized and regulated financial market where securities (bonds, notes, shares) are bought and sold at prices governed by the forces of demand and supply. Stock exchanges basically serve as (1) primary markets where corporations, governments, municipalities, and other incorporated bodies can raise capital by channeling savings of the investors into productive ventures; and (2) secondary markets where investors can sell their securities to other investors for cash, thus reducing the risk of investment and maintaining liquidity in the system. Stock exchanges impose stringent rules, listing requirements, and statutory requirements that are binding on all listed and trading parties. Trades in the older exchanges are conducted on the floor (called the 'trading floor') of the exchange itself, by shouting orders and instructions (called open outcry system). On modern exchanges, trades are conducted over telephone or online. Almost all exchanges are 'auction exchanges' where buyers enter competitive bids and sellers enter competitive orders through a trading day. Some European exchanges, however, use 'periodic auction' method in which round-robin calls are made once a trading day. The first stock exchange was opened in Amsterdam in 1602; the three largest exchanges in the world are (in the descending order) New York Stock Exchange (NYSE), London Stock Exchange (LSE), and the Tokyo Stock Exchange (TSE).

Stock market data is presented at various levels. Level 1 data is the high-level that typical investors such as individuals usually view stock information. FIG. 1 provides a high level snapshot Level 1 data and how a particular security is priced. As shown $1a$ indicates a hid is the price at which one can sell. The price shown on the screen is the highest/best bid currently available in the market. The offer $1b$ is the price at which you can buy. The price shown on the screen is the lowest/best bid currently available in the market. $1c$ is the name of the particular security. The company code $1d$ is a unique identifier under which a company is traded on the London Stock Exchange. Codes for companies will normally be made up of three or four letters and are generally derived from the Security Name. The previous trading period's closing price is indicated by $1e$. The normal market size (NMS) $1f$ defines the quantity for what a reasonable size trade. The last trade price of a security is indicated by $1g$. The mid-price of the security is $1h$. The mid-price is the derived median (halfway point) between the bid and offer price. The change in price between the last trade and previous closing price is indicated by $1i$. The percentage change in price between the last trade and previous closing price is indicated by $1j$. The trade time $1k$ is the time the last trade was executed. The current trading period's highest price is displayed as $1l$. The current trading period's lowest price is displayed as $1m$. The total number of shares traded in the period is $1n$. $1o$ shows the quantity of stock bought or sold in that last trade. The total number of trades or "bargains" that have been executed during the day is indicated by $1p$. The uncrossing price from the last auction is $1q$. $1r$ is the auction volume, which is the number of shares crossed in the last auction. The value of the stock set at the closing of a particular day is $1s$.

While Level 1 data gives a good overview of a security, it does not provide any detail as to what is underlying this, what orders are waiting to be executed or how this might influence the next price move. To get a better insight into what is really happening in the market one will need access to Level 2 Data.

Level 2 market data provides the most comprehensive and in depth set of data available on trading activity. This means more informed trading and investing, through high visibility of the factors and trends underlying price movements, all updated in real time, all the time. With access to Level 2 market data one can:

view the orders awaiting execution on the buy and sell side of the order book;
analyze movements in the price of a security;
monitor fast moving markets;
identify trading opportunities;
help identify iceberg orders or other automated trading patterns; and
utilize a variety of market indicators to make informed decisions.

In addition, with the Level 2 market data one can become a price maker as opposed to a price taker by deciding at what price to buy or sell and placing the order directly with the Exchange's order book via Direct Market Access (DMA).

Processing real-time level 1 financial data (trade information and best bid/ask quotes) is a relatively straightforward exercise in field normalization and storage. Level 2 data (a.k.a., depth-of-book, order book, full depth, consolidated book) is more complicated in that it is two-dimensional, higher-volume, and the required storage is not fixed. To compound that complexity, the available level 2 feeds organize and disseminate data very differently, and different customer applications sometimes prefer to see this data presented to them in very different ways. For example, some of the incoming feeds collect all data at a particular price for a stock, adding up all of the advertised liquidity at that price and sending it out together. Other feeds show individual orders, even if they contain the same price, and they use a private unique order id as the key (rather than the stock name/price). Clients, however, are not concerned with the disparity of incoming data formats, and expect IBM's WFO Feed Handler product will mask these details (even blend different types of data together). Regardless of the incoming format, the client may want to see data separated into orders, or aggregated together by price, or maybe by price per 'market maker', or in a variety of other ways, and they may want to see that data in different wire formats. The excessive permutations of incoming and outgoing data formats present a challenge to the feed handler developer.

The earliest solutions to this problem were very ad hoc. When a new level 2 feed became available, a custom implementation for that feed would be created. When a customer wanted to see data a particular way, the product would be customized to support that format. Some vendors eventually created more generic systems that could accommodate some disparity of incoming data, and organize data in a one of a small set of predefined ways. Most recently, a Skyler has announced a product that is more dynamic and configurable than legacy feed handlers that financial institutions may be running today see (http://www.skylertech.com/solutions/c3_liquidity_discovery_solution.php). However, Skyler's solution is confined to a small subset of predefined incoming and outgoing data formats, and is not fully extensible. Further, its attempt to maintain dynamic per-client views could drain performance.

A better solution would be a streamlined, modular library that was fully fluid and extensible, with a well-thought-out architecture that would easily accommodate an array of different data feeds, with the agility to organize data in as many ways as is fathomable, and with support for an expandable array of well-known or proprietary wire formats.

Although feeds for Level 2 data contain many different pieces of information, in convention processing methods, only certain pieces of the feed data are processed. The lack of processing other data contained in a Level 2 feed wastes much of the information and deprives clients of valuable information about the activity of the stock market. There remains a need for a system and architecture that can process multiple pieces of information from a Level 2 data as desired by a client. There also remains a need for an architecture and interface that can provide newly processed and costumed Level 2 data to clients in formats that are compatible with conventional customer display architectures.

SUMMARY OF THE INVENTION

The present invention processes and distributes Level 2 financial data Raw stock information from various stock feed sources received and processed. Different stock feeds can contain different information. In this invention, a constituent component identifies various pieces of information that contained in stock feeds. These pieces of information are identified and keys are generated based on the various pieces of information and combinations of pieces of information. For example, there can be a key generated for stock price. There can be another key generated for the combination of stock price, number of shares and time of sale. The information in the incoming feeds can be sorted and processed based on a particular key or keys depending on the desires of a particular client. In addition, new keys can be generated based on the preference of a particular client. This flexibility to create the various keys to be used to process feed information is different from conventional methods that use only a standard set of sorting and processing criteria for all feeds and for all clients.

Once the information has been processed according to the preference of a client, the information is then transmitted to the client. The second component of the invention provides an interface that will translate and/or convert the information to a form that is compatible with the equipment of the client. Because the first component will provide information in many new forms, there is a need to have a mechanism that will present the information to the client in a manner that does not require the client to get new or additional equipment in order to receive and view the information. This component of the invention will receive the newly processed data and convert it to a form that the client can view on the client's current equipment. The processing of this new system will be transparent to the client. With the present invention, the client will be able to view information in many different, but on the client's current equipment.

The first component of the Order book Engine API is its paradigm of generating dynamic keys based on its order data model. The Order book Engine API uses a custom, generalized structure for modeling any Order book data and then feeds that structure into a key generator module. From that comes a key value that is used to identify an Order book 'constituent' in a data table, to which the incoming order data is applied. This is superior to the classic order management systems, because it does not pigeonhole data organization into 'market by price' or 'market by order'. Rather, the data can be organized in a vast number of ways depending on the functionality of the key generator that is used. A developer could easily write his or her own key generator and plug it in for their own custom data organization. It could be loaded in as a shared object library, or one could write a dynamic key generator that changes in real time, such as the result of a client request.

The second component of the Order book Engine API is its network of 'managers' and 'publishers'. Managers and publishers have a clear, well-defined interface and they can be swapped out and plugged in. The different implementations and arrangement of these components determine how the data appears to the client. The 'manager' component is just a collection of constituents, grouped as defined by each manager's key generator. The 'publisher' component is responsible for receiving constituent updates and translating to a particular wire format for client consumption. These managers and publishers can be strung together as necessary to create multiple complex data formats for consumption by downstream client applications. This is superior to the existing order book management technologies in that it has a very organized structure, it can accommodate multiple simultaneous data formats, and it is fully extensible. For example, IBM services could quickly develop a proprietary publisher for a customer that desires to see order book data in its own home-grown format. Further, as they are implemented as separate components with rigid interfaces, the components can be spread out across processes, hardware, and networks for scalability purposes.

DESCRIPTION OF THE DRAWINGS

FIG. 3 is system view of the elements in the key generator component of the present invention.

FIG. 4 is a table that describes various pieces of information contained in a security feed.

FIG. 5 is an example of field value pairs of Level 2 publisher output data.

FIG. 6 is an example of a table view of full grid publisher output data.

FIG. 7 illustrates event record publisher mapping of order data to IT record fields.

FIG. 8 is an example current constituent key generator constants.

FIG. 9 is an example of current book manager flags.

FIG. 10 is an illustration of current publication type constant values.

FIG. 11 is an illustration of current instrument key generation values.

DETAILED DESCRIPTION OF THE INVENTION

LEVEL2 data management adds a degree of complexity over LEVEL1 data management. Instead of one-dimensional quote and trade information, LEVEL2 data entails a two-dimensional view of the market. What's more, the various LEVEL2 data feeds are less consistent in modeling their data than their LEVEL1 counterparts. Likewise, downstream consumer applications are more diverse and require that their feed handlers organize the LEVEL2 data in a variety of ways, depending on the application. Considering these factors, it is important to have toolkit for developing LEVEL2 feed handlers that can accommodate the various input and output requirements, while maintaining a clean and intuitive interface. The Order Book Engine API is intended to be such a toolkit.

The Order book Engine API is identified by the 'mds.it-Book Manager' component of the WFO Platform. It is a shared object library with accompanying header files that can be used within a specific feed handler implementation. At the highest level, it uses the notion of a 'manager' and a 'publisher'. The manager is responsible for organizing data in a normalized fashion, while the publisher facilitates dissemination of data to downstream clients in a variety of formats. Managers and publishers can be constructed in a hierarchical fashion, allowing for complex data views that can be managed and published simultaneously.

Figure 1:
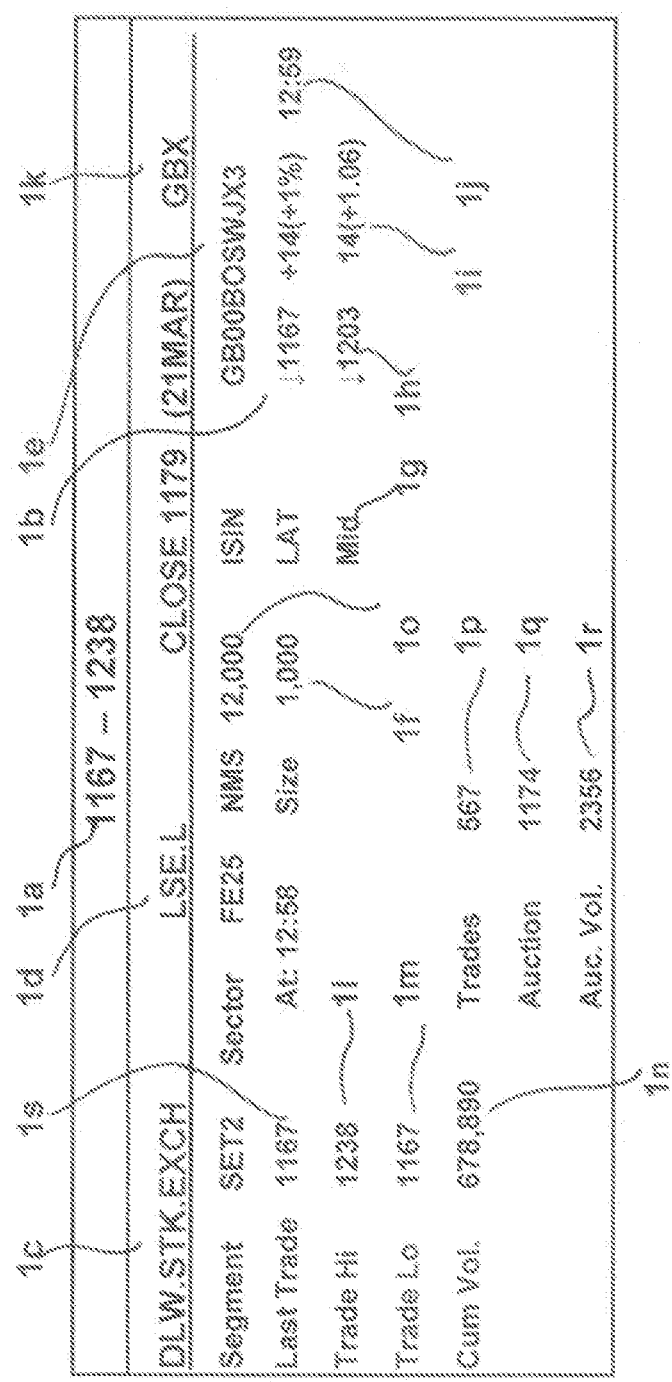
FIG. 1 is an illustration of Level 1 security data and the buying and selling activity of a particular security.
Figure 2:
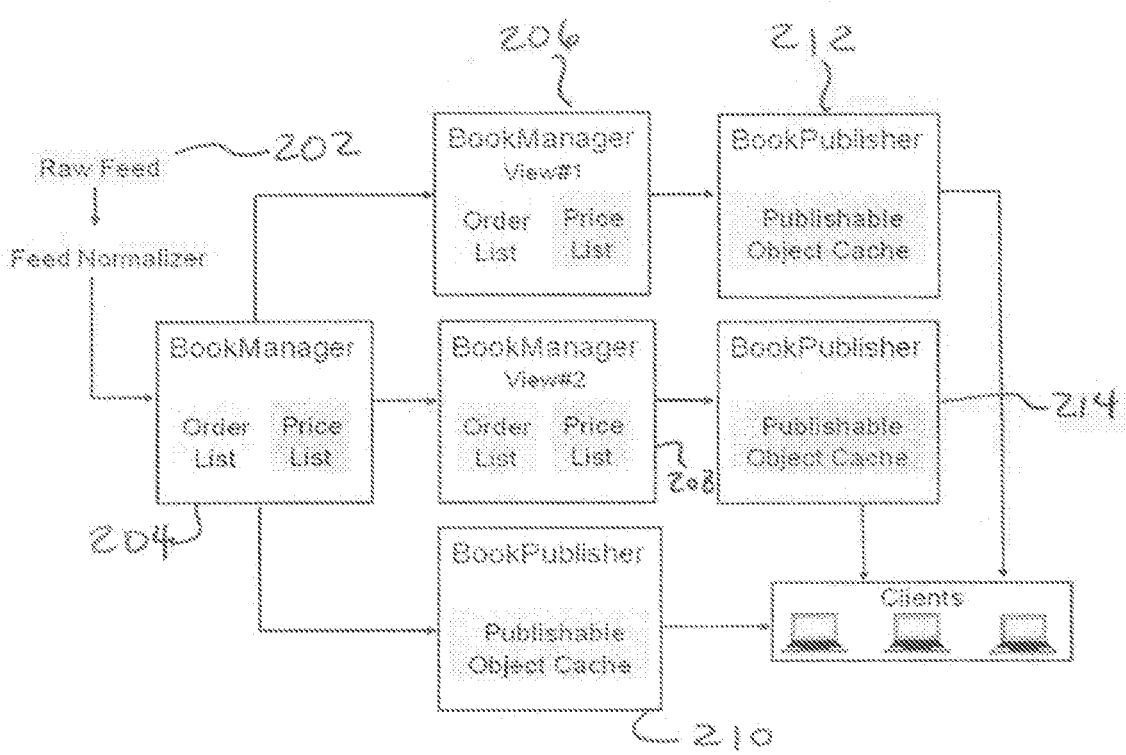
FIG. 2 is a block diagram view of a configuration of the architecture of the present invention.

The present invention is a method and architecture that will increase the capability of processing multiple pieces of Level 2 financial information contained in a Level 2 security data feed. FIG. 2 is a high-level illustration of the architecture in the system of the present invention. At its surface, the Order book Engine API is a toolkit used to develop the LEVEL2 functionality of a feed handler. The Order book Engine is comprised of a network of Book Managers and Book Publishers. A feed handler will read and parse a raw feed, normalize the data to the Order book Engine API format, and submit it. The data will then flow through the Order book Engine to generate output in the desired format.

In FIG. 2, a raw security feed 202 is received into the system architecture of the present invention. The raw feed goes into feed normalizer. The constituent component will analyze the data contained in the feed accounting predefined criteria certain information contained in the security feed. The configuration of FIG. 2 illustrates the constituent component as three book managers. Each book manager contains a key generator to help generalize how data is stored and accessed. FIG. 3 will further illustrate the functions of the key generator. In FIG. 2, the book managers 204, 206 and 208 are configured such that three outputs from the book managers are generated, fed to book publisher components 210, 212 and 214 and then presented to clients 216, 218 and 220. The book managers are configured in series and parallel arrangements. In the series arrangement the information is feed from one book manager 204 to a second book manager 206 and then to book publisher 212. In the second series arrangement, information is fed from book manager 204 to book manager 208 and then to book publisher 214. In the third series arrangement, information is fed from book manager 204 directly to book publisher 210. As shown, information from the raw feed enters book manager 204 and is processed using at least one generated key. In the first two arrangements, the information is processed in the first book manager and then transmitted to the second book manager for additional processing before being sent to the client 216. The information from the first book manager can go through the second book manager as is or the processed data from the first book manager can be further processed in the second hook manager. The processing will depend on the desires of the client requesting the information. The parallel processing capabilities for this invention are evident in the capability to process three different client requests at one time. Another example of parallel capability is ability to process information for one client request on two different machines.

As mentioned each book manager contains a key generator to help generalize how data is stored and accessed. FIG. 3 further illustrates the functions of the key generator. The Order hook Engine API uses a custom, generalized structure for modeling any Order book data and then feeds that structure into a key generator module. From that comes a key value that is used to identify an Order book 'constituent' in a data table, to which the incoming order data is applied. The Order book Engine API uses a custom, generalized structure for modeling any table data. In terms of what a stock market trader considers an order, our notion of an 'order' may actually be a sub-section of an order, or it may be a collection of orders. This is simply how the feed provider decided to arrange their data).

In an embodiment of the present invention, a C++ class is used to collect the following data items for an order: Symbol, MMID, Order ID, Market Side, Current Size, Delta Size, Price, Timestamp, Sequence Number, Feed ID, Number of Orders. The feed handler implementation need only normalize the incoming level 2 feed into this universal class. The order object is then fed into the configured key generator (see attached diagram: KeyGen Illustration.jpg). From that comes a key value that is used to map this order into an Order book 'constituent' (a term used to describe a distinct entity of Order book data as it is organized by the Order book Engine. Data-wise, a constituent is the same as an order). The value of the generated key for the incoming order maps the order to an arbitrary collection of data. As orders come and go that map to that collection, the Order book. Engine API merges those incoming orders into the stored constituents such that the constituents become separate, modular entities of their own.

The current implementation of the key generator is simply as a function. The more appropriate implementation is as a class that is derived from the abstract base key generator. The derived class then can have its own private data that it may use to intelligently produce a usable key from incoming order data. Any implementation of the key generator that conforms to the interface of the abstract key generator base class can be plugged in and used by the Order book engine.

Referring to FIG. 3, data is received at the Feed normalizer 300. After data normalization, block 302 orders the normalized objects. These normalized objects are then feed into a dynamic key generator 304 which generates keys for the data. These generated keys can then be stored in a constituent cache 306. An alternate configuration can comprise a Feed normalize, an Order Book Engine and Middleware.

How the key generator turns an incoming order into a key determines how the data is ultimately sorted. If the key generator simply uses the feed-supplied order id as its output key, then the incoming data will map one-to-one with the stored constituents (since the originating feed ultimately uses the same key for its organization). If the key generator creates a complex key based on the order's symbol, feed id, market maker code, and price, then the incoming orders will ultimately map to a set of 'buckets', each bucket aggregating a set of orders that match this criteria. This is superior to the classic order management systems, because it does not pigeonhole data organization into 'market by price' or 'market by order'. Rather, the data can be organized in a vast number of ways depending on the functionality of the key generator that is used. These key generators have a clear interface, such that different key generators can be plugged into the system at any time. Some common key generators have been implemented to satisfy some typical requirements, but a developer could easily write their own key generator and plug it in for their own custom data organization. The new key generators can be built into the Order book Engine API, or they could be loaded in at runtime as a shared object library. Also, a dynamic key generator could be developed that changes in real time, such as the result of a client request, for 'on-the-fly' data organization.

The Order instance parameter shown in the table FIG. 4 is the class responsible for encapsulating a LEVEL2 constituent. The Book Engine as a whole uses this class heavily to organize data and pass it between processing layers. In some cases, the Book Engine may maintain a sorted list of Order Instances. Specifically, when the Book Engine is maintaining its data based on position relative to other constituents, a doubly-linked list is used. The Order instance inherits from the DLinkElement class so that it can be seamlessly inserted into such a list. In some cases, the Book Engine may maintain a sorted list of Order Instances. Specifically, when the Book Engine is maintaining its data based on position relative to other constituents, a doubly-linked lists is used. The Order instance inherits from the DLinkElement class so that it can be seamlessly inserted into such a list. As shown, this table contains the name of a parameter, the data type for that parameter and a description of the parameter. In some cases, the Book Engine may maintain a sorted list of Order Instances. Specifically, when the Book Engine is maintaining its data based on position relative to other constituents, a doubly-linked list is used. The Order instance inherits from the DLinkElement class so that it can be seamlessly inserted into such a list. In some cases, the Book Engine may maintain a sorted list of Order Instances. Specifically, when the Book Engine is maintaining its data based on position relative to other constituents, a doubly-linked list is used. The Order instance inherits from the DLinkElement class so that it can be seamlessly inserted into such a list. The Order instance object is very common and fundamental, and can be created and destroyed quite regularly. Due to performance considerations, the application programmer should reuse Order instance objects when possible. Additionally, each Book Engine maintains a pool of unused objects that it pulls from when new instances are required. The Order Instance class is derived from ITPool item for this reason. The Book Engine stores its Key Generator, which must be passed in on construction. That Key Generator is paramount in determining how the Book Engine will have its data organized. Every Book Engine operation will require an Order Instance, which will be passed to the Key Generator to map to a stored constituent.

Book Engines can be set up hierarchically. The most common example is when an incoming feed lacks all required data in update messages. Fields like symbol and price may only be available when orders are initially added, and subsequent updates to those orders may only carry an order identifier and the data that is changed. In that case, it is necessary to have a Book Engine configured to use a Key Generator that requires only Order ID. In that case, when an update arrives, the Book Engine will pass the (data deficient) Order Instance to the Key Generator, which will create a valid key based only on Order ID. That key is used to lookup the constituent in the Order Map, which contains all of the constituent information as it was received in an earlier 'add' event. Once the incoming data has been applied to a constituent, it is that updated Order Instance that is passed on to all Book Managers that exist in the managers linked list. In the previous example, the 'second tier' Book Manager will have the complete constituent information in every call, at which point it is free to use more complex Key Generators. For example, the second tier manager in this case can reorganize the data by symbol, price, and feed id.

Second (third, etc.) tier Book Managers can also be used to simply maintain multiple views on the same data simultaneously for the benefit of the downstream clients. Next-tier managers are added to a Book Engine using the addManager( ) method, although it is normally done automatically through the use of the Book Configure utility.

Similar to the list of managers to which data can get passed off, each Book Engine will maintain a list of publishers that data can get passed to. A publisher is like a termination point: the data that the Book Engine provides will be transformed into some publishable data type and sent out to all interested clients. The Order Book Engine API can support multiple data formats in a single Book Engine by attaching the desired Book Publishers.

The Book Publisher receives the processed data from the Book Manager and prepares the data for transmission to the client. Book publishers are added to a Book Engine using the addPublisher( ) method. Again, this is normally done through the Book Configure utility.

The Book Publisher is analogous to a leaf of the Book Engine. The potential network of Book Managers terminates at one or more Book Publishers. The Book Publishers are responsible for translating processed constituent data into a publishable instrument. A Book Publisher may use any data model so long as the proper interface is honored. That interface is very similar to that of the Book Manager: add( ), update( ), and remove( ) methods are required. Those are the only three entry points into the Book Publisher.

The Book Publishers use an instrument Key Generator to determine the name of the publishable object to which they will apply their data. The Key Generator accepts an Order Instance and from it derives a string that represents the instruments name from the perspective of the middleware. The simplest instrument Key Generator will use the Order Instance's 'symbol' field only. In that case, client applications would make requests using the symbol only. Another common instrument Key Generator constructs a name using both the symbol and the market maker identifier. This facilitates an MMID-centric view of the Order Book, and it saves the client the hassle of filtering. There is no limit on the number of Book Publishers that can be implemented. Initially, Book Publisher implementations were created to fully mimic the legacy publish formats of the ITOB. Currently, there are four distinct Book Publishers available.

This publishing format requires that price level management is enabled in the Book Manager. This publisher uses that price level sorting to organize the constituent data into a set of predefined ITRecord fields. Since the names and definitions of those record fields are static, there must be a maximum number of price levels supported. That maximum is a configurable value. FIG. 5 is an example of Field-Value Pairs of a level record publisher output. The IT Record is an ASCII-only data format, so all of the Order Instance data must be appropriately translated within the Level Record Publisher.

Another publisher format for output data is the full grid publisher format shown in FIG. 6. This publishing format is similar to the Level Record Publisher, with similar fields and ASCII data. The dynamic columns of the ITGrid data are created to parallel the IT Record fields in the table above. However, since the ITGrid has a dynamic list of rows, there does not need to be a configured maximum depth to support. Further, the rows of data in the ITGrids are not sorted by price, as they are in the Level Record Publisher. It is worth noting that the Full Grid Publisher currently tends to be the most expensive of the existing publishers processing-wise.

The Full Grid Publisher, which mimics the legacy ITOB ITGrid publishing format, does not contain a column for 'market side'. Therefore, in order to distinguish between 'bid' side and 'ask' side, the instrument Key Generator for a Full Grid Publisher must consider the market side of each Order Instance. Essentially that means that the instrument name format for the Full Grid Publisher will be something like 'IBM_BID' and 'IBM_ASK', which the client must then request separately.

The Full rid Publisher maintains a complete view of data in a single object. If a client application requests an ITGrid that is being maintained by the Full Grid Publisher, then the underlying ITCL has a complete image sitting in its cache that it will forward on to the client. An Event Record Publisher on the other hand publishes only the current updates as they arrive. In order to maintain a full Order Book view in that case, a client application must collect all event record updates as they occur and maintain their own data structures. The Event Record Publisher performs a simple mapping of the incoming Order Instance into a predefined set of record fields. This mapping is illustrated in FIG. 7.

A Native Publisher format uses a custom data type specific to the Order Book Engine API to disseminate data. It utilizes an ITBook Message class that is derived from the ITCL's ITRequest so that it may be serialized and move around within WFO middleware. Just like with the Event Record Publisher, only the most recent update is stored and forwarded to clients. The Native Publisher will send out an ITBook Message with the appropriate add/update/remove opcode, as well as a price position (if available), and all of the Order Instance data. The ITBook Message uses binary serialization.

The feed handler is responsible for parsing incoming data and normalizing that data into Order Instances to be passed into a Book Engine. Through a complex hierarchy of Book Managers, Book Publishers, and Key Generators, that Book Engine has the ability to provide client applications with an extensive variety of views of that normalized feed data. The feed handler does not need to explicitly parse a configuration file and attempt to create the hierarchy of elements to create the desired data view(s). The BookConfigure class contains a set of static methods that can be used for this purpose.

For the feed handler programmer, obtaining a usable Book Engine instance is straightforward and breaks down to a single BookConfigure call. This call requires properly-initialized WFO server platform (mds.itsp) components to function. Therefore, the Order book Engine API as a whole has a hard dependency on the WFO server platform.

When creating a Book Manager, the getBook Engine method utilizes the ITConfigClass object that is stored in the ITBaseFeed and Record Server objects. Using this configuration class, configuration entries are parsed and applied to create the desired data view. With this approach, different groups of configuration entries can be distinguished by their unique names. The following configuration syntax should be used to create Book Managers:
GENERIC_ENTRY BOOKMGR_CREATE_[name] [constituent keygen]:[flags]

The 'name' component should match the name of the Book Manager to be created. That will either be the name that is passed into the getBook Engine method or the name of a 'next tier' manager, which can be added using a separate entry. FIG. 8 shows current 'constituent keygen' constants used to create a book manager. FIG. 9 shows current Book Manager flags.

Referring to FIG. 9, when BOOKMGR_OPT_UNIQUE is set, the Book Engine will log a warning and replace the existing order when an add( ) is called that resolves to a key that is already stored in the Book Engine. When this flag is NOT set, calls to add( ) with duplicate keys are expected, and the number of orders and number of shares will be aggregated among all constituents that resolve to the same key. The BOOKMGR_OPT_THREADSAFE should only be set when it is necessary for the Book Engine to be accessed from separate threads. In our typical server architecture, only a single port would manage a Book Engine, so this flag should not be used, as it degrades performance. The BOOKMGR_OPT_ORDERED will engage the price Manager structure in the Book Engine. In that case, constituents are maintained in a price-sorted list for each symbol in the Book Engine's cache. Any operation will then be published along with the associated price level of the update constituent.

Book Publishers are also created with a specific syntax. When creating a Book Publisher, the following configuration syntax should be used:
GENERIC_ENTRY BOOKPUB_CREATE_[name] [pub type const]:[instrument keygen]

The 'name' component should match the name of a publisher that has been added to an active Book Manager as shown in FIG. 10. FIG. 10 shows current 'pub type const' values. FIG. 11 shows current 'instrument keygen' values.

In order to put the configured Book Managers and Book Publishers to work in the manner intended, the relationships between these components must be laid out. As described above, the getBook Engine method will return the Book Engine object based on the name passed into this method and the corresponding. BOOKMGR_CREATE_XXX entry to match. The following configuration entry will append an additional, next-tier Book Manager to the list that the primary Book Engine will dispatch to:
GENERIC_ENTRY BOOKMGR_ADDMGR_[name] [new name]

The 'name' component must match the name passed into getBook Engine. Likewise, there should also be a BOOKMGR_CREATE_[new name] entry that will define the operation of this new Book Manager. Using this same mechanism iteratively, it is possible to chain different Book Managers together in different fashions to achieve the desired effect.

In the same way, the publishers that are configured can be appended to any of the created book managers to create an endpoint and determine how data will be represented at that endpoint. The configuration entry syntax is very similar to the entry already shown in the above-described figures.

It is important to note that while the present invention has been described in the context of a fully functioning data processing system, those skilled in the art will appreciate that the processes of the present invention are capable of being distributed in the form of instructions in a computer readable storage medium and a variety of other forms, regardless of the particular type of medium used to carry out the distribution. The method of this invention provides significant advantages over the current art. The invention has been described in connection with its preferred embodiments. However, it is not limited thereto. Changes, variations and modification to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

I claim:

1. A system for processing level two financial data, the system having an extensible software architecture and comprising:
   a computing device having computing capabilities and capable of executing an extendible software architecture;
   a stock feed normalizer for receiving and processing raw stock information;
   an object orderer for receiving a normalized stock information in a stock feed;
   a constituent component which will analyze the data contained in the feed accounting predefined criteria, said constituent component comprising a dynamic key generator for creating keys for processing stock information according to predetermined criteria of a particular client; and
   a book publisher for receiving processed data from said constituent component and then formatting the received processed data for delivery to a client, the data being formatted in accordance with parameters predetermined by the client.

2. The system for processing two financial data as described in claim 1 wherein said constituent component is a book manager.

3. The system for processing two financial data as described in claim 1 further comprising a plurality of constituent components.

4. The system for processing two financial data as described in claim 3 wherein said plurality of constituent components are arranged in a series configuration such that information is sequentially transmitted from one constituent component to another constituent component.

5. The system for processing two financial data as described in claim 1 wherein said constituent component further comprises a constituent cache for storing generated keys.

6. The system for processing two financial data as described in claim 1 further comprising a book configuration utility for adding a constituent component or book publisher to the software architecture.

7. A method for processing level two financial data on an extensible software architecture comprising the steps of:
   receiving, on a computing device having an extensible software architecture, a feed of raw financial data;
   identifying a set of parameters for analyzing the received financial data;
   normalizing the raw financial data; generating, at a book manager, one or more keys for processing the received data based on the set of identified parameters;
   processing the received financial data using the generated keys;
   transmitting the processed financial data to a book publisher component;
   formatting the received processed financial data at the book publisher in accordance with predetermined criteria from a client; and
   transmitting the processed and formatted data to the client in a format determined by a predetermined set of parameters of a particular client.

8. The method for processing level two financial data as described in claim 7 further comprising before said financial data receiving step, the step of configuring hierarchical software architecture for processing level two financial data.

9. The method for processing level two financial data as described in claim 8 wherein said step of transmitting processed and formatted data to the client further comprises simultaneously maintaining multiple views of data for downstream clients.

10. The method for processing level two financial data as described in claim 8 further comprising maintaining a list of book publishers in the software architecture that can receive data.

11. A computer program product in a computer readable storage medium for processing level two financial data comprising:
   instructions receiving a feed of raw financial data;
   instructions identifying a set of parameters for analyzing the received financial data;
   instructions normalizing the raw financial data; instructions generating, at a book manager, one or more keys for processing the received data based on the set of identified parameters of a particular client;
   instructions processing the received financial data using the generated keys;
   instructions transmitting the processed financial data to a book publisher component;
   instructions formatting the received processed financial data at the book publisher in accordance with predetermined criteria from a client; and
   instructions transmitting the processed and formatted data to the client in a format determined by a predetermined set of parameters.

12. The computer program product for processing level two financial data as described in claim 11 further comprising before said financial data receiving instructions, instructions configuring hierarchical software architecture for processing level two financial data.

13. The computer program product for processing level two financial data as described in claim 12 wherein said instructions transmitting processed and formatted data to the client further comprises instructions simultaneously maintaining multiple views of data far downstream clients.

14. The computer program product for processing level two financial data as described in claim 12 further comprising instructions maintaining a list of book publishers in the software architecture that can receive data.

* * * * *